UNITED STATES PATENT OFFICE.

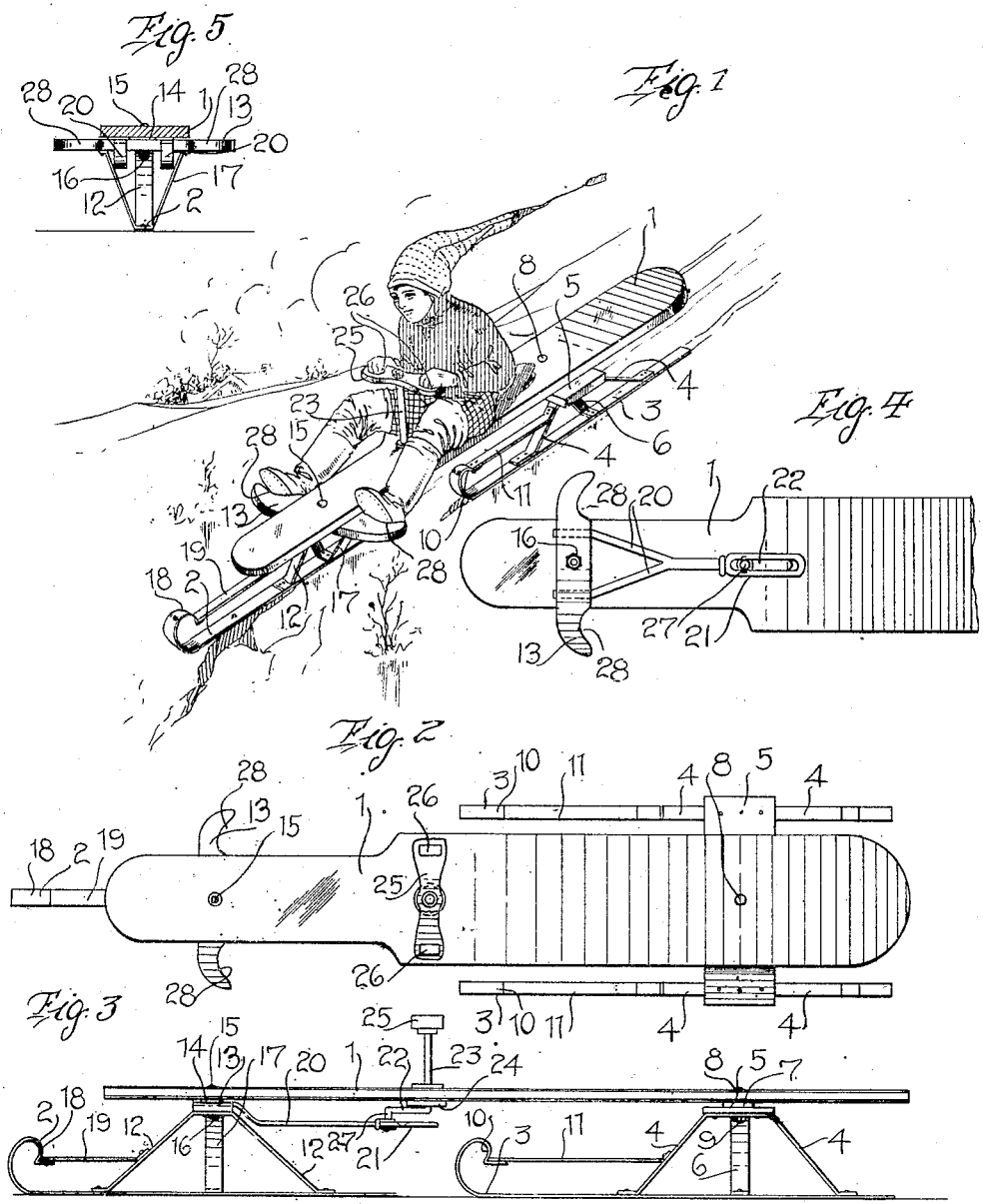

CHARLES STARK, OF FORESTON, MINNESOTA.

SLED.

1,082,565.

Specification of Letters Patent.  Patented Dec. 30, 1913.

Application filed May 24, 1913. Serial No. 769,730.

*To all whom it may concern:*

Be it known that I, CHARLES STARK, a citizen of the United States, residing at Foreston, in the county of Millelacs and State of Minnesota, have invented certain new and useful Improvements in Sleds, of which the following is a specification, reference being had to the accompanying drawings.

This invention relates to new and useful improvements in sleds and more particularly to hand sleds for coasting, the object of the invention being to provide a coasting sled which is simple and durable in its construction and which is provided with novel and simple steering mechanism whereby the sled may be readily guided when in use.

Another object of the invention is to provide a sled of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claim and shown in the accompanying drawings, in which—

Figure 1 is a detail perspective view of a coasting sled constructed in accordance with my invention; Fig. 2 is a top plan view; Fig. 3 is a side elevation; Fig. 4 is a bottom plan view of the forward end of the sled; and Fig. 5 is a transverse sectional view.

Referring more particularly to the drawings, 1 indicates the platform of my improved sled which is supported at its front end by means of a single runner 2 and at its rear end with a pair of spaced runners 3. The runners 3 are rigidly held in position by means of the inverted U-shaped brackets 4, the ends of which are arranged in spaced relation and are bolted or otherwise secured to the upper face of the runners or shoes 3. The intermediate portions of the brackets 4 are bolted or otherwise secured to the ends of the cross piece 5. The runners or shoes 3 are further held in spaced relation and against lateral movement by means of a brace member 6, the ends of which are secured to each of the runners 3 and the intermediate portion thereof bolted or otherwise secured to the cross piece 5.

Arranged between the cross piece 5 and the platform 1 is a bolster 7 which is securely held in place by means of the bolt 8, said bolt passing down through the platform, through the bolster and through the cross piece 5. A nut 9 is threaded upon the lower end of the bolt 8 to securely hold the same in place. The forward ends of the runners or shoes 3 are curved upwardly and downwardly, as shown at 10, and the extreme ends thereof disposed in substantially a horizontal position. Brace rods 11 are provided, the forward ends of which are bolted or otherwise secured to the horizontal portion of the extreme ends of the shoes 3. The rear ends of the rods 11 are bolted to one of the side portions of the brackets 4 to securely hold the curved ends 10 of the shoe 3 in place.

The runner or shoe 2, which supports the forward end of the platform 1 is securely held in position by means of a bracket 12, the ends of which are bolted or otherwise secured to the shoe and the intermediate portion thereof bolted or otherwise secured to the cross piece 13 which is pivotally secured to the lower face of the platform 1. Arranged between the platform and the cross piece 13 is a bolster 14, said bolster being held in position by means of the bolt 15 which passes through the platform, through the bolster and then through the cross piece 13 where a nut 16 is threaded upon the lower end thereof to securely hold the bolt in place. A U-shaped brace member 17 is provided, the intermediate portion of which is bolted or otherwise secured to the upper face of the runner or shoe 3 and the ends thereof being arranged in spaced relation and secured to the under face of the cross piece 13.

The outer end of the shoe 2 is curved upon itself, as shown at 18 and its extreme end is disposed in a substantially horizontal position. A brace rod 19 is provided, one end of which is bolted or otherwise secured to the horizontal portion of the curved end 18. The other end of said rod is rigidly secured to one of the upright portions of the bracket 12 so as to securely hold the outer end of the runner in position. A yoke member 20 is provided, the ends of which are arranged upon opposite sides of the pivot bolt 15 and secured to the cross piece 13. The intermediate portion of the yoke 20 is provided with an elongated loop 21 in which is mounted the downwardly bent end of the arm 22 formed integral with the steering post 23 and disposed at right angles thereto. The steering post 23 is rotatably mounted within an opening formed in the platform 1 and in a bearing 24 which is secured to the lower face of the platform.

Secured to the upper end of the steering post 23 is a handle member 25, the ends of which are provided with suitable gripping places 26. From this it will be apparent that by the turning movement of the steering shaft 23, the downwardly turned end 27 of the arm 22 will move within the slot 21 and force the inner end of the yoke 20 from side to side so that by having the ends of the yoke secured to the cross piece 13, the shoe or runner 2 will be quickly and readily moved in the direction desired. The cross piece 13 is provided upon its inner edge with the cut away curved portions 28 whereby the feet of the operator may be placed therein to assist in steering the sled.

From the above it will be readily apparent that I have provided a simple and durable sled which is especially adapted for use in coasting and which is provided with simple and novel steering mechanism whereby the same may be readily guided. It will also be apparent that the device is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the class described including a platform, a pair of spaced runners supporting the rear end of the platform, a single runner mounted for pivotal movement and supporting the forward end of the platform, an inverted U-shaped brace member having its ends secured to the upper face of the runner, a cross piece bolted to the intermediate portion of the brace member, said cross piece having a curved portion cut in each end thereof, a second U-shaped brace member having its intermediate portion secured to the upper face of the single runner and its ends arranged in spaced relation and secured to the under face of the cross piece, a yoke having its ends secured to the said cross piece adjacent the curved portions and provided at its intermediate portion with an elongated loop, a steering post rotatably mounted within the platform, an arm formed integral with the lower end of the post and provided with a downwardly turned end arranged within said loop, and a cross piece upon the upper end of the steering post for rotating the same whereby the arm will actuate the yoke to steer the single runner.

In testimony whereof I hereunto affix my signature in the presence of two witnesses.

CHARLES STARK.

Witnesses:
RAY F. BOCKOVEN,
G. L. MCMILLAN.